(12) United States Patent
Sheng

(10) Patent No.: US 10,274,669 B2
(45) Date of Patent: Apr. 30, 2019

(54) FLAT LAMP HAVING A SUCKING BUFFER LAYER FOR ATTACHING A BACKLIGHTING SYSTEM TO A BACKPLANE PREVENTING DEFORMATION OF THE LIGHT GUIDE PLATE

(71) Applicant: KUNSHAN CHENGTAI ELECTRIC CO., LTD, Kunshan (CN)

(72) Inventor: Yulin Sheng, Kunshan (CN)

(73) Assignee: KUNSHAN CHENGTAI ELECTRIC CO., LTD, Kunshan (CN)

( * ) Notice: Subject to any disclaimer, the term of this patent is extended or adjusted under 35 U.S.C. 154(b) by 0 days.

(21) Appl. No.: 15/941,007

(22) Filed: Mar. 30, 2018

(65) Prior Publication Data

US 2018/0224597 A1    Aug. 9, 2018

Related U.S. Application Data

(63) Continuation-in-part of application No. PCT/CN2017/089184, filed on Jun. 20, 2017.

(30) Foreign Application Priority Data

Aug. 30, 2016    (CN) .......................... 2016 1 0814316

(51) Int. Cl.
F21S 8/00 (2006.01)
F21V 8/00 (2006.01)
(Continued)

(52) U.S. Cl.
CPC .............. *G02B 6/0093* (2013.01); *F21S 8/00* (2013.01); *F21V 7/22* (2013.01); *F21V 15/04* (2013.01);
(Continued)

(58) Field of Classification Search
CPC .... G02B 6/0093; G02B 6/009; G02B 6/0088; F21S 8/00; F21V 7/22; G02F 1/133308;
(Continued)

(56) References Cited

U.S. PATENT DOCUMENTS

2007/0139964 A1    6/2007    Peng et al.
2010/0328575 A1*   12/2010   Shinkai ................ G02B 5/0215
                                                              349/62
(Continued)

FOREIGN PATENT DOCUMENTS

CN    102588802 A    7/2012
CN    203395846 U    1/2014
(Continued)

OTHER PUBLICATIONS

Machine Translation of CN 204313129 U.*

*Primary Examiner* — Jong-Suk (James) Lee
*Assistant Examiner* — Christopher E Dunay
(74) *Attorney, Agent, or Firm* — Gokalp Bayramoglu

(57) ABSTRACT

The present invention disclosed a flat lamp, comprising a light guide layer, a reflective layer, a diffusion layer, a buffer layer, and a backplane, the light guide layer has two opposite faces including a back face and a light emitting face, the reflective layer is located on the back face of the light guide layer, the diffusion layer is located on the light emitting face of the light guide layer, the buffer layer is located between the backplane and the reflective layer, and several light guide points are provided between the reflective layer and the light guide layer, the flat lamp further comprises a light source and an outer frame, with incident points being located on a lateral side of the light guide layer, the stacked structure is in the shape of a flat plate.

15 Claims, 10 Drawing Sheets

(51) Int. Cl.
*F21V 7/22* (2018.01)
*F21V 15/04* (2006.01)
*F21V 19/00* (2006.01)

(52) U.S. Cl.
CPC .............. *F21V 19/00* (2013.01); *G02B 6/009* (2013.01); *G02B 6/0058* (2013.01); *G02B 6/0065* (2013.01); *G02B 6/0076* (2013.01); *G02B 6/0088* (2013.01); *G02B 6/0046* (2013.01); *G02B 6/0051* (2013.01); *G02B 6/0055* (2013.01); *G02B 6/0073* (2013.01); *G02B 6/0078* (2013.01); *G02B 6/0085* (2013.01)

(58) Field of Classification Search
CPC ......... G02F 1/133311; G02F 1/133314; G02F 1/133317; G02F 1/133305
See application file for complete search history.

(56) References Cited

U.S. PATENT DOCUMENTS

| | | | | |
|---|---|---|---|---|
| 2011/0292685 | A1* | 12/2011 | Park | G02B 6/0055 362/624 |
| 2013/0286631 | A1* | 10/2013 | Chen | G06F 3/0202 362/23.03 |
| 2015/0212262 | A1* | 7/2015 | Chiang | G02B 6/0093 362/611 |
| 2015/0309240 | A1* | 10/2015 | He | G02B 6/0036 362/606 |
| 2015/0316710 | A1* | 11/2015 | Liu | G02B 6/0093 362/615 |
| 2016/0270217 | A1* | 9/2016 | Park | H05K 5/0017 |
| 2016/0313500 | A1* | 10/2016 | Wu | G02B 6/0088 |
| 2017/0192147 | A1* | 7/2017 | Ha | G02B 6/0031 |
| 2017/0254947 | A1* | 9/2017 | Fan | G02B 6/0043 |
| 2017/0307801 | A1* | 10/2017 | Sheng | F21S 8/04 |
| 2017/0313622 | A1* | 11/2017 | Ogami | C03C 21/005 |
| 2018/0120644 | A1* | 5/2018 | Aeo | G02F 1/133308 |

FOREIGN PATENT DOCUMENTS

| | | | |
|---|---|---|---|
| CN | 104315421 A | | 1/2015 |
| CN | 204313129 U | * | 5/2015 |
| CN | 104806921 A | | 7/2015 |
| CN | 106195804 A | | 12/2016 |
| CN | 205979421 U | | 2/2017 |

* cited by examiner

FLAT LAMP HAVING A SUCKING BUFFER LAYER FOR ATTACHING A BACKLIGHTING SYSTEM TO A BACKPLANE PREVENTING DEFORMATION OF THE LIGHT GUIDE PLATE

CROSS REFERENCE TO RELATED APPLICATIONS

This application is a continuation application in part of International Application No. PCT/CN2017/089184, filed on Jun. 20, 2017, which is based upon and claims priority to Chinese Application No. 201610814316.3 filed on Aug. 30, 2016, the entire contents of which are incorporated herein by reference.

TECHNICAL FIELD

The present invention relates to the technical field of lamps, and particularly relates to a flat lamp.

BACKGROUND

The LED (Light Emitting Diode) technology has been widely promoted for the advantages of power saving, high brightness, long service life, and good seismic performance. In recent years, LED lights have become more and more widely used in daily lighting and displays. The more common applications, such as LED lamp panels, that is, a plurality of LED lamp caps are arranged in an array in a lampshade, and the corresponding drive circuit is provided in the lampshade, the structure is simple and practical, but LED lamp panels are comparatively dazzling and the uniformity of the emitted light is poor (uniformity<70%) because LED lamp panels use direct type light source. Therefore, a kind of LED flat lamps have been developed, which is square flat shape, and the inner parts of the kind of LED flat lamps are flat shape, the flat reflection layer, light guide layer and diffusion layer are installed in a rectangular outer frame successively, and LED lamp bars are installed in the rectangular outer frame and at the side edge of the light guide layer, the light is subjected to multiple reflections under the combined effect of the reflective layer and the light guide layer to improve uniformity and effectively prevent glare through the diffusion layer. The kind of LED flat lamps emit light and generate heat during operation, and the LED flat lamp is easily deformed and damaged based on the principle of thermal expansion and cold contraction if the generated heat cannot be released in time, which shortens the service life.

In addition, the flat lamp in the prior art has the following problems:

1. The diffusion plate uses the same material, such as: PS (polystyrene)\PMMA (polymethyl methacrylate)\PC (polycarbonate)\PET (polyethylene terephthalate)\PP (poly Propylene\PE (polyethylene), etc., but not limited to these materials, PS\PMMA\PC\PET has good flatness but is a hard material, and PP/PE material is soft, deformable and not flat enough thereof. The conventional light guide layer is also made of the same plastic material, such as PS\PMMA\PC\PET, but not limited to these materials. In the design of the conventional flat lamp and surface light source product, the light guide layer and the diffusion layer are tightly attached to each other. If the light guide layer and the diffusion layer are made of the same material, the light-emitting surface of the light guide layer gets easily damaged, which cause the light guide layer to be scrapped. Therefore, the diffusion layer and the light guide layer of the flat lamp and the surface light source product in the prior art are basically made of same material, if PS\PMMA\PC\PET materials with better flatness and hardness are adopted, the light-emitting surface of the light guide layer may get easily damaged, which cause the light guide layer to be scrapped; if softer material like PP\PE is adopted, the diffusion layer gets deformed easily and has poor flatness, and the diffusion anti-glare effect is influenced;

2. The normal service life of the conventional flat lamp is often reduced due to the damage of the LED lamp beads, and the main reason is that two LED lamp bars loaded with several LED lamp beads in the flat lamp are oppositely arranged on opposite sides of the light guide layer, heat is generated while the LED lamp beads emit light after the flat lamp is turned on, and the light guide layer expands to the periphery when heated, therefore the LED lamp beads on the two sides of the LED lamp bars are extruded, which causes damage of the LED lamp beads badly, and shortens the service life of the whole LED flat lamp;

3. The light guide layer is not suitable for large size production due to process problems, the light guide layer can only be spliced in the manufacturing process of large-scale LED flat lamp, but this way of splicing the light guide layer has the following defects: there are light seams in the junction of the light guide layer due to light leakage and unevenness, which not only affect the aesthetic appearance of the whole flat lamp, but also affect the uniformity of light emission, this defect affects further development of the large-scale LED flat lamp market and become the main reason that restrict the market domination rate ascension.

The large-scale flat lamp also has the defects that the light source is integrated with the lamp, if the light source is damaged, replacement is not easy and the replacement cost is high. Besides, the large-scale flat lamp also has poor light uniformity and poor utilization efficiency.

In addition, the light guide plate is an optical grade acrylic PMMA (polymethyl methacrylate)/PS (polystyrene)/MS (polyacrylate)/PC (but not limited to the above material) plate, with the characteristics of extremely high reflectivity and non-absorbing light, and is widely used in LCD (Liquid Crystal Display) and LED (Light Emitting Diode) displays. The light guide plate uses the optical grade acrylic plate to absorb the light emitted from the lamp, when the light hits each light guide point, the reflected light will be diffused at each angle, and then the reflected light will be emitted from the front of the light guide plate. Through a variety of light guide points of different densities and sizes, the light guide plate can be uniformly illuminated, and the line light source can be converted into the surface light source.

Most of the current wedge-shaped light guide plates are manufactured by injection molding, and the principle is that optical grade PMMA/PS/MS/PC (but not limited to the above materials) particles are injected into a mold to be cooled and molded by an injection molding machine at high temperature and high pressure. Generally speaking, injection molding wedge-shaped light guide plate is easy to produce burrs and irregular shapes, resulting in uneven stress, poor flexibility, easy to break down when bended, and low brightness, low product yield rate, especially a very high mold cost, it is necessary to reopen different molds as long as inclined plane angle or product size is changed, mold cost is extremely high and the change becomes very troublesome.

SUMMARY OF THE INVENTION

The technical problem mainly solved by the present invention is to provide a flat lamp, the buffer layer can be a plastic product with functions of buffer and anti-deformation; the buffer layer can use unilateral light incidence of the wedge-shaped light guide layer and buffer materials. In addition, the diffusion layer has the functions of changing color and protecting the light guide layer from scratches. Moreover, the invention is suitable for large flat lamps with the spliced light guide layer, and the flat lamp also has the advantages of uniform light emission, low cost, scientific structural design and ease of implementation. Additionally, in the processing of the wedge-shaped light guide plate in the flat lamp, the wedge-shaped light guide plates of different inclined plane angles and thickness can be produced by adjusting the angle and distance between the rollers of the nip roller group, instead of opening molds for each size of light guide plate, which not only greatly reduces the production cost, but also enables continuous production, stable production process, and high efficiency.

In order to solve the above problems in the prior art, the technical solutions of the present invention are as follows: a flat lamp includes a light guide layer, a reflective layer, a diffusion layer, a buffer layer and a backplane, the light guide layer has two opposite faces including a back face and a light emitting face; the reflective layer is located on the back face of the light guide layer; the diffusion layer is located on the light emitting face of the light guide layer; the buffer layer is located between the backplane and the reflective layer; and several light guide points are provided between the reflective layer and the light guide layer.

The flat lamp also includes a light source and an outer frame. The diffusion layer, the light guide layer, the reflective layer, the buffer layer and the backplane are all fixed in the outer frame; incident points of the light source are located on a lateral side of the light guide layer; a stacked structure composed of the backplane, the light guide layer, the reflective layer, the buffer layer and the diffusion layer is in the shape of a flat plate.

Further, the buffer layer is a plastic sucking buffer layer, which is a plastic sucking product composed of convex parts and concave parts arranged in a row.

Further, the light guide layer is a wedge-shaped light guide layer with a right-angled trapezoidal cross-section; the thick side of the light guide layer is the light incident side provided with LED light bars, and the thin side of the light guide layer is provided with buffer materials.

Further, the thickness of the buffer layer is 0.3-15 mm.

Further, the stacked structure composed of the backplane, the light guide layer, the reflection layer, the buffer layer and the diffusion layer are in the shape of a flat plate structure which is one of the following three:

(1) The light guide layer, the buffer layer, the reflective layer and the backplane are all in the shape of a flat plate, the buffer layer is parallel to the backplane, the light guide layer is parallel to the buffer layer;

(2) The light guide layer is a wedge-shaped light guide layer with a right-angled trapezoidal cross-section, the buffer layer is a wedge-shaped buffer layer with a right-angled trapezoidal cross-section, and the back face of the light guide layer is a first inclined plane, the side of the buffer layer close to the reflection layer is a second inclined plane, the first inclined plane is parallel to the second inclined plane, the reflection layer is positioned between the first inclined plane and the second inclined plane, and the backplane and the reflection layer are in the shape of a flat plate.

(3) The light guide layer is a wedge-shaped light guide layer with a right-angled trapezoidal cross-section, the backplane is a wedge-shaped layer with a right-angled trapezoidal cross-section, and the back face of the light guide layer is a first inclined plane, the inner face of the backplane is a second inclined plane, the first inclined plane is parallel to the second inclined plane, and the backplane and the reflection layer are both in the shape of a flat plate.

Further, the diffusion layer comprises a first diffusion monolayer and a second diffusion monolayer; the first diffusion monolayer has opposite two faces including a light incident face and a first superimposed face of the diffusion layer; the second diffusion monolayer has opposite two faces including a light emitting face and a second superimposed face of the diffusion layer; the first superimposed face of the first diffusion monolayer and the second superimposed face of the second diffusion monolayer superimposed on each other; the incident face of the first diffusion monolayer and the light emitting face of the light guide layer are in contact with each other, and the hardness of the first diffusion monolayer is smaller than that of the second diffusion monolayer.

Further, the structure of the diffusion layer is one of the following three:

(1) One of the first diffusion monolayer and the second diffusion monolayer is a colored layer;

(2) The first diffusion monolayer and the second diffusion monolayer are both colored layers;

(3) The first diffusion monolayer and the second diffusion monolayer are both natural color layers, and further including a light transmitting colored layer positioned between the first diffusion monolayer and the second diffusion monolayer.

Further, the light source is two LED light bars positioned on the side face of the light guide layer; the light guide layer is in the shape of square; the light guide layer is provided with opposite back face and light emitting face, and four side faces, the back face of the light guide layer is provided with a plurality of light guide points; the two LED light bars are respectively arranged at one pair of adjacent side faces of the light guide layer; and the other pair of adjacent side faces of the light guide layer are provided with buffer materials.

Further, the arrangement structure of the light guide points starts from the intersection point of the pair of adjacent side faces and gradually increases the unit coverage area of the light guide points along the back face of the light guide layer.

Further, the light source is positioned in the outer frame and on the side face of the light guide layer; at least one of the outer frame and the backplane is provided with slots for inserting and removing the light source.

Further, a light entrance for guiding light is reserved on the outer frame and the side faces of the light guide layer.

Further, the light guide layer is spliced; the light guide layer is formed by splicing a plurality of light guide plates on the same plane; and the reflective layer is closely superimposed on the back face of the light guide layer; the contact face of the reflective layer and the light guide layer has, light guide points; and the diffusion layer is 1-3 cm away from the light guide layer.

Further, the flat lamp also includes a glass plate; the face of the glass plate superimposing the reflection layer is a back face and the other face is a front side; a plurality of light guide points are formed on the back face of the glass plate; the front face of the glass plate is a rugged rough face; and the glass plate forms an integrated light guide layer and diffusion layer.

Further, the light guide layer is a central light guide layer, further including a side light guide layer; the central light guide layer has a back face, a light emitting face opposite to the back face, and a side face located between the back face and the light-emitting face; the back face of the central light guide layer has a plurality of light guide points; the side light guide layer is positioned on the side face of the central light guide layer; and the side light guide layer has a rear face parallel to the back face of the central light guide layer, a front face opposite to the rear face, an inner side face opposite to the side face of the central light guide layer, and an outer side face opposite to the inner side face; the inner side face of the side light guide layer is in contact with the side face of the central light guide layer, the outer side of the side light guide layer has a plurality of light guide points; the light source is arranged at the side light guide layer; and the light source is incident between the inner and outer side faces of the side light guide layer along the length direction of the side light guide layer.

Further, the structure of the light guide points is one of the following:

1. The light guide points are positioned on the back face of the light guide layer;
2. The light guide points are positioned on the reflective layer and face the side of the light guide layer;
3. Further including a transparent film on which the light guide points are printed, and the transparent film is adhered to the back face of the light guide layer;
4. Further including a transparent film on which the light guide points are printed, and the transparent film is adhered to the reflective face of the reflective layer.

Further, the light guide points are convex dots or concave dots.

Further, the light guide points are composed of ink screen printing, coating, hot pressing, laser dotting or dots or lines directly formed on the back face of the light guide layer.

Further, the arrangement structure of the light guide points is one of the following three:

1. The interval of the light guide points is the same, and the size of the light guide points increases gradually.
2. The interval of the light guide points increases gradually, and the size of the light guide points is the same.
3. The interval and the size of the light guide points both increase gradually.

Further, the shape of the light guide points is a rhombus, a regular pentagon, an equilateral triangle, a circle, a regular hexagon, air ellipse, or a regular octagon.

Further, the plastic sucking buffer layer is a PVC (Polyvinyl chloride) layer, a PET layer, a PP layer, a PE layer, a PMMA layer, a PC layer, or a PS layer.

Further, the light guide layer is a glass layer or a transparent plastic layer, and the transparent plastic layer is a PMMA layer, a PC layer, a GPPS (General purpose polystyrene) layer or a PET layer.

Further, the outer frame is a metal outer frame, the metal outer frame is rectangular, formed by bending and welding a whole metal section, the metal section is provided with a first face and a second face which are mutually vertical and integrally formed, the first face is a continuous strip shape, the second face is a broken strip shape with four incisions, each of the incision is similar and has an isosceles triangle shape with a vertex angle of 90 degrees, the four incisions divide the second face into five trapezoidal faces, the metal section is bent at the four incisions and form a rectangular metal outer frame through an end to end connection, the first face of the metal section is bent at the positions corresponding to the four incisions respectively, to form four rounded corners, welding between the adjacent trapezoidal faces of the second face of the metal section and the trapezoidal faces connected end to end is done at the waist, the first face of the metal section forms the side frame face of the metal outer frame and the four rounded corners form four corners of the metal outer frame, and the second face of the metal section forms the front bearing face of the metal outer frame.

Further, the outer frame is a plastic outer frame and integrally formed into a plastic outer cover with the diffusion layer, and the diffusion layer is integrally connected with the front end of the plastic outer frame at the edge thereof.

Further, the light source is LED, OLED (Organic light-emitting diode) or laser.

Further, reflection sheets are provided on the side face of the light guide layer except for the portion where the light source is positioned.

Preferably, the light source is incident on the side face of the light guide layer, and the flat lamp is provided with long afterglow materials; the structure of the flat lamp provided with the long afterglow material flat lamp is that, the long afterglow light-transmitting plastic plate is arranged between the reflection layer and the light guide layer, or/and between the light guide layer and the diffusion layer.

Preferably, the long afterglow light-transmitting plastic plate is a light-transmitting plastic flake, the surface of which is coated with a long afterglow coating, the light-transmitting plastic flake is a long afterglow light-transmitting plastic flake formed by adding long afterglow materials into the raw materials, and is provided with a light incident face and a light emitting face opposite to the light incident face, at least one of the light incident face and the light emitting face is coated with the long afterglow coating, the face on the light-transmitting plastic flake is called a coating face, and the structure of the long afterglow coating on the light-transmitting plastic plate is one of the following four:

1. The coating face is completely coated by a long afterglow coating of the same color;
2. The coating face is divided into at least two regions, each region is correspondingly coated with a long afterglow coating of one color, and different regions are coated with the long afterglow coatings of different colors to form an indicating diagram;
3. The coating face is divided into a bare area exposing the coating surface and a covering area covering the long afterglow coating, and the long afterglow coating covers the covering area to form an indicating diagram;
4. The long afterglow coating has at least two layers, the at least two layers of the long afterglow coatings have different colors and different coating ranges to form an indicating diagram.

Further, the flat lamp includes an installation top shell with a fixed device, the fixed device can fix the installation top shell on the ceiling, and the outer frame is detachably connected to the installation top shell.

Further, the fixed device is a clamp spring.

Further, the first diffusion monolayer is a PS layer, a PMMA layer, a PC layer or a PET layer, and the second diffusion monolayer is a PP layer or a PE layer.

Further, the buffer materials are strip-shaped buffer material strips continuously distributed along the side face of the light guide layer or point-shaped buffer material blocks discontinuously distributed along the side face of the light guide layer.

Further, the buffer materials are springs, EVA (ethylene-vinyl acetate copolymer) buffer materials, EPS (expandable polystyrene) buffer materials, EPP (Expandable Polypropylene) buffer materials, EPE (Expandable Polyethylene) buffer materials or EPO (Expanded Polyolefin) buffer materials.

Further, the LED light bars are positioned between the outer frame and the light guide layer, and the buffer materials are positioned between the outer frame and the light guide layer.

Further, the buffer materials are adhered to the side face of the light guide layer or the inner side face of the outer frame.

Further, the outer frame has a side frame face and a front end bearing face positioned at the front end of the side frame, the backplane is positioned on the back face of the buffer layer and fixed at the rear end of the outer frame, and the slots, are arranged at the edge of the backplane and at least one of the side frame face and the front end bearing face of the outer frame.

Further, the front face of the glass plate is a frosted face after polished.

Further, the front face of the glass plate is a jade sand face formed by erosion of liquid medicine.

Further, the central light guide layer is rectangular, and the side light guide layer is provided on at least one of the side face.

Further, four side light guide layers are arranged on the four side faces of the central light guide layer respectively, the side light guide layers on the four side surfaces are connected into a circle, and the end of the side light guide layer on one side face is provided with the light source.

Further, the light source is embedded in the side light guide layer.

Further, the inner side face of the side light guide layer is the same in size as the side face of the central light guide layer in which the side light guide layer is positioned.

Further, the rear face of the side light guide layer is covered with a reflective layer, and the front face of the side light guide layer is covered with a reflective layer.

Further, the processing method of the wedge-shaped light guide plate includes the following steps: (wedge-shaped light guide plate, namely wedge-shaped light guide layer).

S1. Melting solid raw materials for processing the light guide plate into liquid resins;

S2. Extruding the liquid resins to a nip roller group by a plastic extruder, the nip roller group is provided with at least one group and each one includes a first roller and a second roller which are not parallel to each other; an included angle is formed between the first roller and the second roller; the liquid resins are extruded by the first roller and the second roller when passing between the first roller and the second roller, then form a wedge-shaped light after cooling.

Further, the included angle between the first roller and the second roller is adjustable.

Further, the light guide plate is a wedge-shaped light guide plate with right-angle trapezoidal cross section; in step S2, the first roller and the second roller are both cylindrical.

Further, the light guide plate includes a wedge-shaped light guide part with a right-angle trapezoidal cross section and light incident adjusting parts positioned at least one side of the high and low sides of the wedge-shaped light guide part, the cross section of the light incident adjusting parts are rectangular;

In step S2, the first roller is a cylinder, the middle of the second roller is a cylinder, and the end parts of the second roller form truncated cones matched with the light incident adjusting parts of the light guide plate.

Further, in step S2, the nip roller group includes a first roller, a second roller and a third roller, the second roller and the third roller are symmetrically arranged; the liquid resins are initially shaped by passing between the first roller and the second roller and then are shaped again by passing between the first roller and the third roller to form the light guide plate.

Further, in step S2, at least one of the face of the first roller and the second roller is provided with a pattern, the liquid resins pass between the first roller and the second roller, the pattern is pressed on the face of the light guide plate to form a light guide pattern, and a continuous light guide plate is formed, and then the continuous light guide plate is cut into the light guide plates of a desired size.

Further, in step S2, the faces of the first roller and the second roller are both glossy faces, and the liquid resins form a continuous and smooth light guide plate after passing between the first roller and the second roller; and then the continuous light guide plate is cut into light guide plates of a desired size.

Further, at least one side of the light guide plate of the light surface has a light guide pattern, and the structure of the light guide pattern is one of the following three:

1. The light guide pattern is a pattern formed on the face of the light guide plate through a laser dotting process;
2. The light guide pattern is a pattern formed on the face of the light guide plate through an ink printing process;
3. The light guide pattern is a pattern formed on the face of the light guide plate through a hot embossing pattern process.

Further, the number of light incident adjusting parts is two, a first light incident adjusting part is positioned on the lower side of the wedge-shaped light guide part and a second light incident adjusting part is positioned on the higher side of the wedge-shaped light guide part.

In step S2, the first roller is a cylinder, the middle of the second roller is a cylinder, and one end part of the second roller forms a first truncated cone matched with the first light incident adjusting parts of the light guide plate, and the other end part also forms a second truncated cone matched with the second light incident adjusting part.

Further, the angle-adjustable nip roller group used for producing the wedge-shaped light guide plate is provided with at least one group, and each group includes a first roller and a second roller which are not parallel to each other, an included angle is formed between the first roller and the second roller, and the magnitude of the included angle can be adjusted, the method for realizing the adjustable included angle between the first roller and the second roller is one of the following two:

1. The end of the second roller close to the first roller can rotate in the plane where the second roller and the first roller are positioned;
2. The end of the second roller far away from the first roller can be lifted or lowered in the plane where the second roller and the first roller are positioned.

The advantages of the present invention: the advantages of the present invention at least include the following points:

1. The present invention includes a light guide layer, a reflective layer, a diffusion layer, buffer layer and a backplane, the buffer layer is adopted between the backplane and the reflective layer, so that the present invention not only has the deformation function of buffering heat expansion and cold contraction, but also is beneficial to improve the radiating effect as the buffer layer material is thin, so that the product has the advantage of long service life and has the effect of buffering and damping in the transportation process, which can effectively avoid damage in the transportation process and is convenient to transport;

2. The buffer layer is a plastic sucking product composed of convex parts and concave parts arranged in a row, so the buffering effect is better, and as the buffer layer adopts a plastic sucking process, the material can be saved, the weight can be lighter, and the material cost can be greatly reduced;

3. The light guide layer of the present invention can be a wedge-shaped light guide layer with a right-angle trapezoidal cross section, the thick side of the light guide layer is the light incident side provided with LED light bars, and the thin side of the light guide layer is provided with buffer materials, when the LED light bars is heated, the whole light guide layer is expanded towards the buffer material, and the buffer material also generates concave or contracted elastic deformation to absorb the heat expansion deformation of the light guide layer, so that the light guide layer is prevented from extruding the LED lamp beads, the damage of the LED lamp bead caused by the heat expansion deformation of the light guide layer can be avoided, and the service life of the flat lamp source can be effectively improved;

4. The light guide layer of the present invention can be a wedge-shaped light guide layer with a right-angle trapezoidal cross section, under the condition, the buffer layer is a wedge-shaped buffer layer with a right-angle trapezoidal cross section or the backplane is a wedge-shaped plate with a right-angle trapezoidal cross section, a flat plate shape is still formed after superposed which is also suitable for the LED flat lamp; the applicability is wide, and the light guide efficiency of the right-angle trapezoidal structure of light guide layer is higher, the light guide layer structure of the right-angle trapezoid can save one third of the material compared with the traditional plate-shaped light guide layer structure under the same light guiding efficiency; the present invention is more in line with the national energy-saving and consumption-reducing policy, and is also beneficial to reducing the product cost;

5. The diffusion layer of the present invention can include a first diffusion monolayer and a second diffusion monolayer, the first diffusion monolayer is contacted with the light guide layer, the hardness of the first diffusion monolayer is smaller than that of the second diffusion monolayer, because the soft material with lower hardness is adopted at the side close to the light guide layer, namely the first diffusion monolayer, the problem that the light guide layer is scrapped due to friction damage of the light guide emerging surface can be effectively avoided, and the material with higher hardness is adopted at the other side far away from the light guide layer and is not easy to deform, so better flatness and good diffusion anti-glare effect can be provided;

and at least one of the first diffusion monolayer and the second diffusion monolayer is a colored layer, or a light-transmitting colored layer is additionally arranged between the first diffusion monolayer and the second diffusion monolayer, so that a plurality of color-changing diffusion layers with different colors can be made, the attractiveness of the product can be improved, colored light can be generated, and the personalized design feeling can be strong;

6. The light bars of the present invention can be arranged on one pair of adjacent side faces of the light guide layer, and the other pair of adjacent side faces are provided with buffer materials; when the light guide layer is heated, since the resistance in the direction in which the buffer material is provided is smaller than the direction in which the LED light bar is provided, so the light guide layer is integrally expanded towards the buffer materials, and the buffer materials also generates concave or contracted elastic deformation to absorb the heat expansion deformation of the light guide layer, so that the light guide layer is prevented from extruding the LED lamp heads, the damage caused by the heat expansion deformation of the light vide layer can be avoided, and the service life of the LED penal light source can be effectively improved; when the light guide layer is not heated, the light guide layer is cooled and retracted, and the buffer material is restored to the original state; the arrangement structure of the light guide points on the light guide layer can make the light emitted by the LED lamp beads uniform after passing through the light guide layer; the reflective layer reflects the light back to the light guide layer to improve the usage, efficiency of the light;

7. The present invention can be characterized in that the light source is positioned in the outer frame and at the side face of the light guide layer, at least one of the outer frame and the backplane is provided with slots capable of inserting and removing the light source; the outer frame, the reflective layer, the light guide layer, the diffusion layer and the backplane form a lamp body structure produced in a unified way; the light source slots are inserted into the lamp body, and light sources with different powers are inserted into lamp body structures with unified production, unified size and appearance to assemble the flat lamps with different powers, so that the light sources are installed or replaced without disassembling the lamp body, the maintenance and the power replacement of the flat lamps are convenient, the unified production, sale and use of the flat lamps with different powers are realized, the traditional thoughts and the defects that the light sources of the flat lamps are fixedly packaged in the lamp bodies during production and the flat lamps need to be disassembled during maintenance are broken, the present invention is a great breakthrough in the production, sale and use of flat lamps;

8. The invention can be characterized in that a light entrance for guiding light is reserved on the outer frame and at the side of the light guide layer, and an outside light source can enter, for example, the outside light source is sunlight, the sunlight is collected by the condenser element, and then is guided into the lamp through the guide cable and the light entrance; the sunlight is fully utilized, and the diversification and market demand of the light source of the flat lamp are realized;

9. The light guide layer of the present invention can be formed by splicing a plurality of light guide plates, the distance between the diffusion layer and the light guide layer is 1-3 cm, and because of the distance of 1-3 cm, the light emitted by the splicing seam of the light guide plate can be diffused further through the diffusion layer, so that the strange effect at the splicing seam of the light guide plate can be completely invisible, the purpose of uniform and beautiful light emission of the large-scale flat lamp is realized, and the method is low in cost and easy to implement;

10. The flat lamp of the present invention can include a glass plate, the side of the glass plate superposed with the reflective layer is the back face and the other side is the front face, a plurality of light guide points are formed on the back face of the glass plate, and the front face of the glass plate is an uneven rough face, the glass plate forms an integrated light guide layer and a diffusion layer; when light rays impinge on each light guide point positioned on the back face of the glass plate, the reflected light is diffused to various angles and emitted from the front face of the glass plate, so that the line light source can be converted into the face light source, and the reflective layer can reflect the light exposed at the bottom of the glass plate back into the glass plate to improve the usage efficiency of the light, because the front face of the glass plate is rough, glare can be effectively prevented, and the traditional diffusion layer is replaced, therefore, the LED flat lamp can emit uniform and soft light with high luminous efficiency: and compared with the high-cost diffusion layer and the high-cost acrylic light guide layer in the prior art, the light guide layer adopts the glass plate and the front face of the glass plate simultaneously has the light diffusion function, so that the structure is simplified and the cost is low;

11. The light guide layer of the present invention can be a central light guide layer and further includes a side light guide layer, the back face of the central light guide layer is provided with light guide points; the side light guide layer is positioned on the side face of the central light guide layer; the inner side face of the side light guide layer is contacted with the side face of the central light guide layer, and the outer side face of the side light guide layer is provided with the light guide points; the light source is arranged at the side light guide layer and incident between the inner side and the outer side face of the side light guide layer along the length direction of the side light guide layer the light source uniformly incident on the central light guide layer through the inner face of the side light guide layer after the primary guiding of the side light guide layer, the light after primary light guiding passes through the central light guide layer, and then is uniformly emitted from the light emitting face of the central light guide layer after secondary light guiding, the light source generated by the light guide structure is more uniform than the face light source, generated by the traditional light guiding layer; because of the support of the secondary light guide structure, the single high-power light source can be converted into the face light source, which replaces the traditional structure that uses LED light bar to convert light into face light sources after passing through the light guide layer, and makes a great breakthrough and open up a new milestone for the development of flat lamps;

12. The method for processing the wedge-shaped light guide plate includes the following steps: melting solid raw materials for processing the light guide plate into liquid resins; extruding the liquid resins to nip roller groups by a plastic extruder, each nip roller group includes a first roller and a second roller, the liquid resins are extruded by the first roller and the second roller when passing between the first roller and the second roller, then form a wedge-shaped light guide plate after cooling: compared with the traditional injection molding method, the advantages of the processing method are as follows:

1. The wedge-shaped light guide plates of different inclined plate angles and thickness can be produced by adjusting the angle and distance between the rollers of the nip roller group, instead of opening molds for each size of light guide plate, which not only greatly reduces the production cost, but also enables continuous production, stable production process, and high efficiency;

2. The light guide plate can be cut optionally according to the required specification, so the size of the light guide plate is flexible, and the applicability is strong;

3. Compared with the traditional flat plate-shaped light guide plate, the wedge-shaped light guide plate can save about 40 percent of materials without influencing the light guide effect, thereby the wedge-shaped light guide plate greatly saves the material cost and improve the competitive price advantage of the product;

4. In the processing of the guide plate, at least one of the face of the first roller and the second roller is provided with a pattern; when the liquid resins pass between the first roller and the second roller, the pattern is pressed on the face of the light guide plate to form the light guide pattern, and the light guide points are formed on the face of the light guide plate during extrusion molding; the light points are processed without printing, hot pressing, laser dotting and the like, so that the processes are reduced, the efficiency is improved, and the production cost is further reduced;

5. The end parts of the second roller are arranged as the truncated cones, light incident adjusting parts are formed on the high and low sides of the wedge-shaped light guide part of the light guide plate in the extrusion molding process, so that the process is reduced, the cost is saved, and the light incident adjusting part can adjust the uniformity of the incident light.

The above description is only an overview of the technical solution of the present invention, in order to better understand the technical means of the present invention, and the technical solution can be carried out according to the content of the specification, the detailed description of the preferred embodiment of the present invention and the drawings are as follows.

BRIEF DESCRIPTION OF THE DRAWINGS

FIG. 22-1 is a front view of the nip roller group according to the embodiment 14 of the present invention;

FIGS. 22-2 is a top view of the nip roller group according to the embodiment 14 of the present invention;

FIGS. 22-3 is a left view of the nip roller group according to the embodiment 14 of the present invention;

FIGS. 23-1 is a front view of the roller group according to the embodiment 15 of the present invention;

FIGS. 23-2 is a top view of the nip roller group according to embodiment 15 of the present invention;

FIGS. 23-3 is a left view of the nip roller group according to the embodiment 15 of the present invention;

FIGS. 24-1 is a front view of the nip roller group according to the embodiment 16 of the present invention;

FIGS. 24-2 is a top view of the nip roller group according to the embodiment 16 of the present invention;

FIGS. 24-3 is a left view of the nip roller group according to the embodiment 16 of the present invention;

FIGS. 25-1 is a front view of the roller group according to the embodiment 17 of the present invention;

FIGS. 25-2 is a top view of the nip roller group according to the embodiment 17 of the present invention;

FIGS. 25-3 is a left view of the nip roller group according to the embodiment 17 of the present invention;

Figure 1:
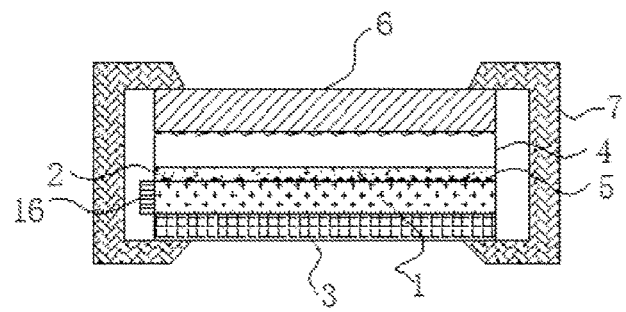
FIG. 1 is a schematic structural diagram of the present invention (taking the case that the light source is positioned inside the outer frame as an example)

Each part of the drawings is marked as follows:

light guide layer 1, reflective layer 2, diffusion layer 3, buffer layer 4, light guide points 5, convex parts 41, concave parts 42, backplane 6, outer frame 7, first diffusion monolayer 31, second diffusion monolayer 32, light transmitting colored layer 33, second inclined plane 8, buffer materials 9, slots 10, light entrance 11, light guide plates 12, glass plate 13, central light guide layer 14, side light guide layer 15, light source 16, first face 71, second face 72, incision 73, rounded corner 74, installation top shell 17, fixed device 18, LED light bars 19 and first inclined plane 20;

light guide plate 100, wedge-shaped light guide part 101, first light incident adjusting part 102, and second light incident adjusting part 103; nip roller group 21, first roller 22, second roller 23, truncated cones 231, and third roller 24.

DETAILED DESCRIPTION OF THE INVENTION

The following describes specific embodiments of the present invention through specific embodiments. Those skilled in the art can easily understand the advantages and effects of the present invention by the contents disclosed in this specification. The present invention can also be embodied in other different ways, that is, different modifications and changes can be made without departing from the scope of the present invention.

A flat lamp, as shown in FIG. 1, includes a light guide layer 1, a reflective layer 2, a diffusion layer 3, a buffer layer 4 and a backplane 6; and the light guide layer 1 has two opposite faces including a back face and a light emitting face; the reflective layer 2 is located on the back face of the light guide layer 1; the diffusion layer 3 is located on the light emitting face of the light guide layer 1; the buffer layer 4 is located between the backplane 6 and the reflective layer 2; and several light guide points 5 are provided between the reflective layer 2 and the light guide layer 1; the flat lamp also includes a light source 16 and an outer frame 7, the diffusion layer 3, the light guide layer 1, the reflective layer 2, the buffer layer 4 and the backplane 6 are all fixed in the outer frame 7; incident points of the light source 16 are positioned on a lateral side of the light guide layer 1.

The stacked structure composed of the backplane 6, the light guide layer 1, the reflective layer 2, the buffer layer 4 and the diffusion layer 3 are in the shape of a flat plate.

Figure 2:
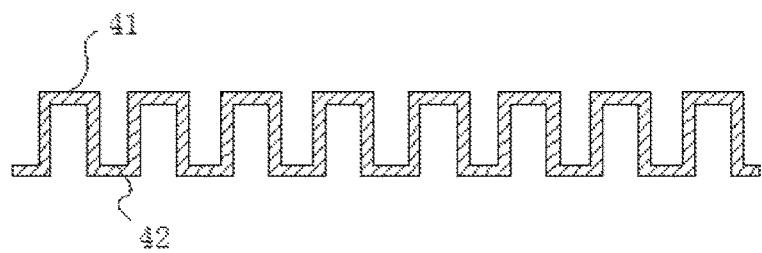
FIG. 2 is a sectional view of the plastic sucking buffer layer of the present invention.
Figure 3:
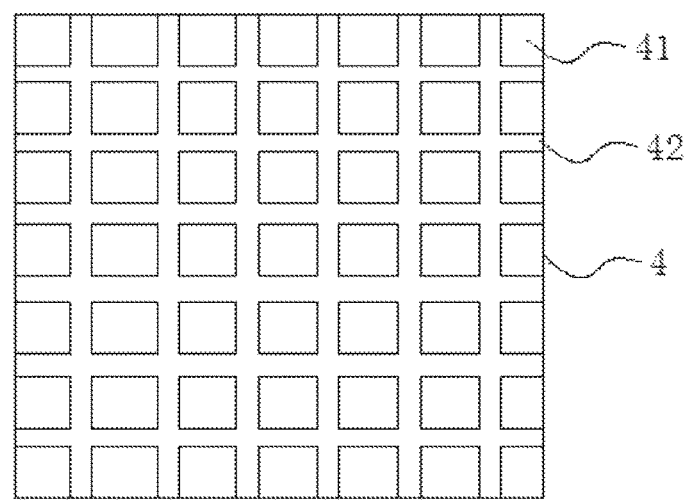
FIG. 3 is a top view of the plastic sucking buffer layer of the present invention.

The buffer layer 4 is a plastic sucking buffer layer, which is a plastic sucking product composed of convex parts 41 and concave parts 42 arranged in a row, as shown in FIGS. 2 and 3, the buffer layer 4 can also be buffer materials of non-plastic sucking product, such as, but not limited to, springs, EVA (ethylene-vinyl acetate copolymer), EPP (Expandable Polypropylene EPE (Expandable Polyethylene, or EPO (Expanded Polyolefin).

Preferably, the thickness of the buffer layer 4 is 0.3-15 mm.

The plastic sucking buffer layer is a PVC (Polyvinyl Chloride) layer, a PET (Polyethylene Terephthalate) layer, a PP (Polypropylene) layer, a PE (Polyethylene) layer, a PMMA (Polymethyl Methacrylate) layer, a PC (Polycarbonate) layer, a PS (Polystyrene) layer or a plastic layer made of other materials. The PS layers include, but are not limited to, general polystyrene (GPPS), high impact polystyrene (HIPS), expandable polystyrene (EPS), and metallocene polystyrene (SPS). The PE layer includes, but is not limited to, high density polyethylene (HDPE) and low-density polyethylene (LDPE).

Because the plastic sucking buffer layer is vacuum adsorbed on the face of the mold and formed after cooling, the process is simple, and the plastic sucking buffer layer is easy to process; the plastic sucking buffer layer can be designed with different patterns which looks more beautiful.

Embodiment 1

Figure 4:
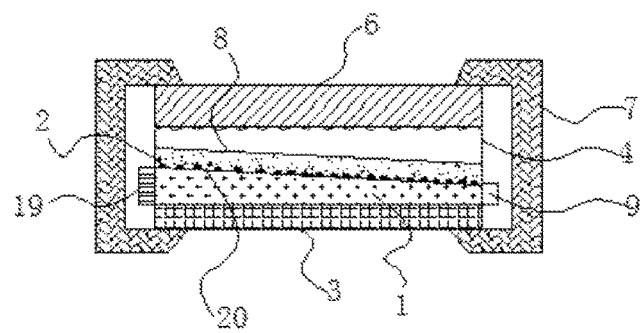
FIG. 4 is a schematic structural diagram of the embodiment 1 of the present invention (taking a wedge-shaped buffer layer having a right-angle trapezoidal cross section as an example)

A flat lamp as shown in FIG. 4, the light guide layer 1 is wedge-shaped with a right-angled trapezoidal cross-section; the thick side of the light guide layer 1 is the light incident side provided with LED light bars 19, and the thin side of the light guide layer is provided with buffer materials 9, wherein the cross section of the buffer layer 4 or the backplane 6 is also a right-angle trapezoid, and the stacked structure composed of the backplane 6, the light guide layer 1, the reflective layer 2, the buffer layer 4 and the diffusion layer 3 is in the shape of a flat plate.

Embodiment 2

Figure 5:
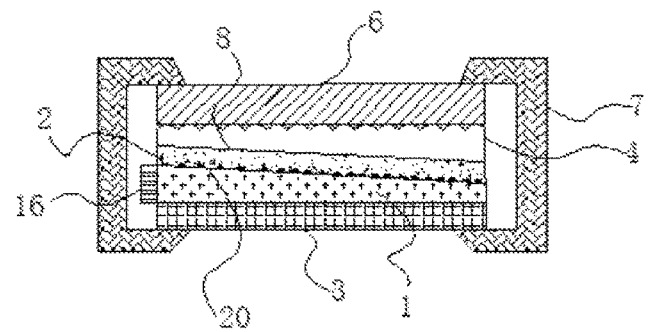
FIG. 5 is a schematic structural diagram of the embodiment 2 of the present invention.
Figure 6:
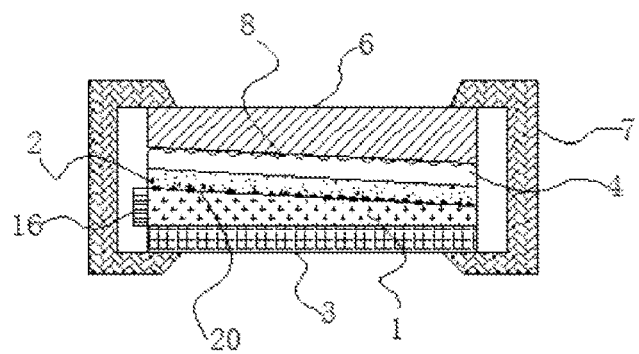
FIG. 6 is another schematic structural diagram of the embodiment 2 of the present invention.

A flat lamp, the stacked structure composed of the backplane 6, the light guide layer 1, the reflection layer 2, the buffer layer 4 and the diffusion layer 3 is in the shape of a flat plate structure which is one of the following three:

(1) The light guide layer 1, the buffer layer 4, the reflective layer 2 and the backplane 6 are all in the shape of a flat plate, as shown in FIG. 1;

(2) The light guide layer 1 is a wedge-shaped light guide layer with a right-angled trapezoidal cross-section, the buffer layer 4 is a wedge-shaped buffer layer with a right-angled trapezoidal cross-section, and the back face of the light guide layer 1 is a first inclined plane 20, the side of the buffer layer 4 close to the reflection layer 2 is a second inclined plane 8, the first inclined plane 20 is parallel to the second inclined plane 8, the reflection layer 2 is positioned between the first inclined plane 20 and the second inclined plane 8, and the backplane 6 and the reflection layer 2 are in the shape of a flat plate, as shown in FIG. 5;

(3) The light guide layer 1 is a wedge-shaped light guide layer with a right-angled trapezoidal cross-section, the backplane 6 is a wedge-shaped layer with a right-angled trapezoidal cross-section, and the back face of the light guide layer 1 is a first inclined plane 20, the inner face of the backplane 6 is a second inclined plane 8, the first inclined plane 20 is parallel to the second inclined plane 8, and the backplane 6 and the reflection layer 2 are in the shape of a flat plate, as shown in FIG. 6.

The reflective layer 2, the light guide layer 1 and the diffusion layer 3 are three-layer coextrusion or double-layer coextrusion.

Embodiment 3

Figure 7:
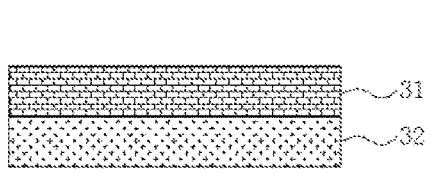
FIG. 7 is one of the structural schematic diagrams of the diffusion layer according to the embodiment 3 of the present invention (excluding, the light-transmitting colored layer)
Figure 8:
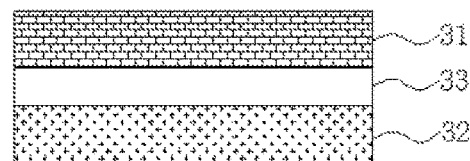
FIG. 8 is one of the structural schematic diagrams of the diffusion layer according to the embodiment 3 of the present invention (including the light-transmitting colored layer)

As shown in FIGS. 7 and 8, the embodiment 3 has a similar structure to that of embodiment 1, except that: the diffusion layer 3 includes a first diffusion monolayer 31 and a second diffusion monolayer 32; the first diffusion monolayer 31 has opposite two faces including a light incident face and a first superimposed face of the diffusion layer 3; the second diffusion monolayer 32 has opposite two faces including a light-emitting face and a second superimposed face of the diffusion layer 3; the first superimposed face of the first diffusion monolayer 31 and the second superimposed face of the second diffusion monolayer 32 are superimposed on each other; the incident face of the first diffusion monolayer 31 and the light-emitting face of the light guide layer 1 are in contact with each other, and the hardness of the first diffusion monolayer 31 is smaller than that of the second diffusion monolayer 32.

The structure of the diffusion layer is one of the following three:

(1) One of the first diffusion monolayer 31 and the second diffusion monolayer 32 is a colored layer, as shown in FIG. 7;

(2) The first diffusion monolayer 31 and the second diffusion monolayer 32 are both colored layers;

(3) The first diffusion monolayer 31 and the second diffusion monolayer 32 are both natural color layers, and further including a light transmitting colored layer positioned between the first diffusion monolayer and the second diffusion monolayer, as shown in FIG. 8.

The first diffusion monolayer 31 is a PS layer, a PMMA layer, a PC layer or a PET layer, and the second diffusion monolayer 32 is a PP layer or a PE layer.

The first diffusion monolayer 31 close to the light guide layer 1 uses soft materials having higher shielding property such as PP and the like, which can reduce the visibility of the light guide layer dots effectively and improve the aesthetics of products and the yield of the light guide layer; the second diffusion monolayer 32 far away from the light guide layer 1 use materials with higher hardness such as PS and the like, which is able to provide higher light effect and rigidity.

The diffusion layer 3 is a diffusion layer of UGR (uniform glare value)<19.

The processing technology of the diffusion layer 1 may be, but is not limited to, a multilayer extrusion, a film coating technology, or a multilayer composite technology.

Embodiment 4

Figure 9:
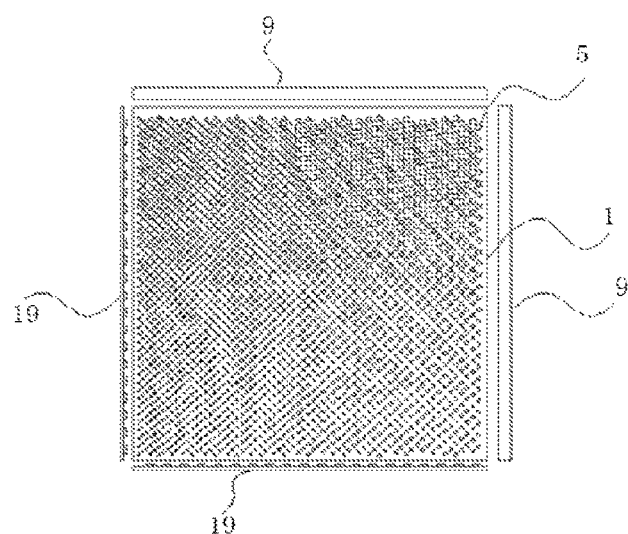
FIG. 9 is a schematic diagram of an optical structure of the embodiment 4 of the present invention.
Figure 10:
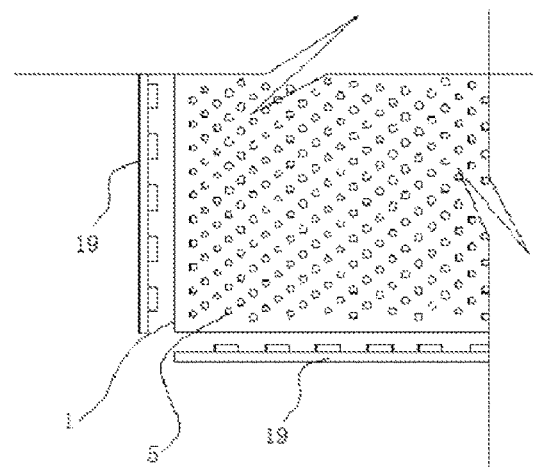
FIG. 10 is a schematic diagram of an arrangement structure of the light guide points according to the embodiment 4 of the present invention (taking circular light guide points as an example, the distance between the light guide points is the same and the size of the light guide points is gradually increased)

As shown in FIGS. 9 and 10, the light source 16 is two LED light bars 19 positioned on the side face of the light guide layer; the light guide layer 1 is in the shape of square; the light guide layer 1 is provided with opposite back face and light emitting face, and four side faces, the back face of the light guide layer 1 is provided with a plurality of light guide points 5; the two LED light bars are respectively arranged at one pair of adjacent side faces of the light guide layer 1; and the other pair of adjacent side faces of the light guide layer 1 is provided with buffer materials 9.

The buffer materials 9 are strip-shaped buffer material strips distributed along the side face of the light guide layer 1 continuously or point-shaped buffer material blocks distributed along the side face of the light guide layer 1 discontinuously.

The buffer materials are springs, EVA (Ethylene-Vinyl Acetate Copolymer) buffer materials, EPS (expandable polystyrene board), EPP (Expandable Polypropylene) buffer materials, EPE (Expandable Polyethylene) buffer materials, or EPO (Expanded Polyolefin) buffer materials.

The LED light bars 19 are positioned between the outer frame 7 and the light guide layer 1, the buffer materials 9 are positioned between the outer frame 7 and the light guide layer 1.

The buffer materials 9 are adhered to the side face of the light guide layer 1 or the inner side face of the outer frame 7.

The arrangement structure of the light guide points 5 is one of the following three:

1. The interval of the light guide points 5 is the same and the size of the light guide points 5 increases gradually, as shown in FIG. 9;

2. The interval of the light guide points 5 increases gradually, and the size of the light guide points 5 is the same;

3. The interval and the size of the light guide points 5 both increase gradually.

Embodiment 5

Figure 11:
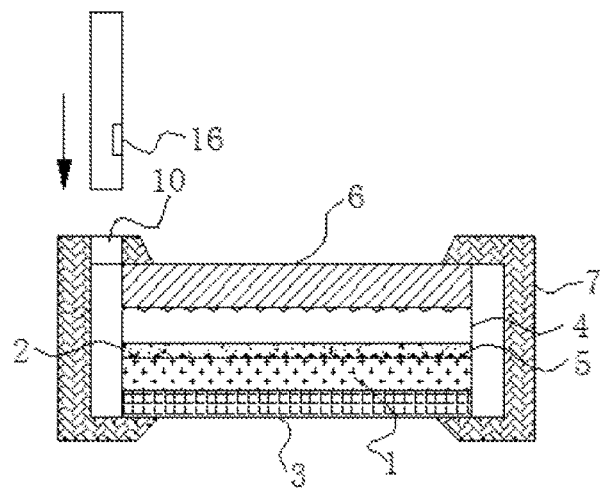
FIG. 11 is one of the structural diagrams of the embodiment 5 of the present invention (taking the case that the slots are opened on the rear frame face of the outer frame as an example)
Figure 12:
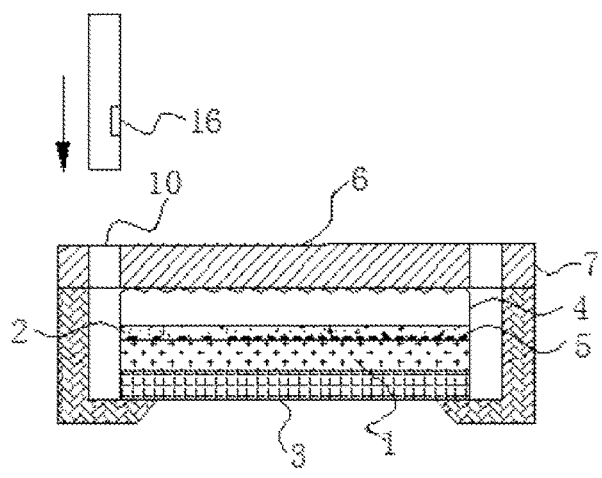
FIG. 12 is another schematic structural diagram of the embodiment 5 of the present invention (taking the case that the slots are opened on die backplane as an example)

As shown in FIGS. 11 and 12, the light source 16 is positioned in the outer frame 7 and on the side face of the light guide layer 1; at least one of the outer frame 7 and the backplane is provided with slots for inserting, and removing the light source 16; wherein the slots of FIG. 11 are opened on the rear frame face of the outer frame 7, and the slots of FIG. 12 are opened on the backplane 6.

The outer frame 7 has a side frame face and a front end bearing face positioned at the front end of the side frame, the backplane 6 is positioned on the back face of the buffer layer 4 and fixed at the rear end of the outer frame 7, and the slots 10 are arranged at the edge of the backplane 6 and at least one of the side frame face and the front end bearing face of the outer frame.

Embodiment 6

Figure 13:
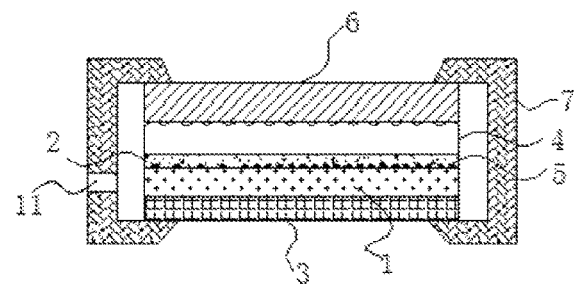
FIG. 13 is a schematic structural diagram of the embodiment 6 of the present invention (the light entrance is reserved)

As shown in FIG. 13, a light entrance 11 for guiding light is reserved on the outer frame 7 and the side faces of the light guide layer 1.

Preferably, a light guide cable is inserted into the light entrance 11, one end of the light guide cable is connected with the side face of the light guide layer 1, and the other end of the light guide cable is connected with an external light source, such as sunlight, and the external light source is converged by the condenser element and connected with the light guide cable.

Embodiment 7

Figure 14:
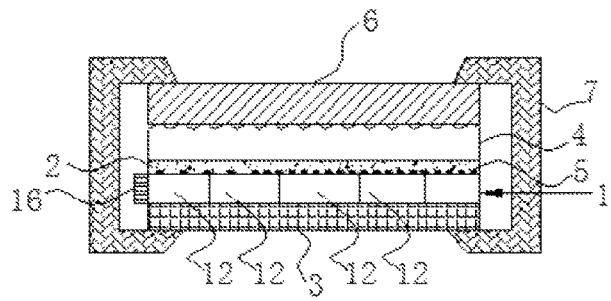
FIG. 14 is a schematic structural diagram of the embodiment 7 of the present invention.

As shown in FIG. 14, the light guide layer 1 is a spliced light guide layer; the light guide layer 1 is funned by splicing a plurality of light guide plates on the same plane; and the reflective layer 2 is closely superimposed on the back face of the light guide layer 1; the contact face of the reflective layer 2 and the light guide layer 1 is provided with light guide points 5; and the diffusion layer 3 is 1-3 cm away from the light guide layer 1.

Preferably, the diffusion layer is 2 cm from the light guide layer 1.

Embodiment 8

Figure 15:
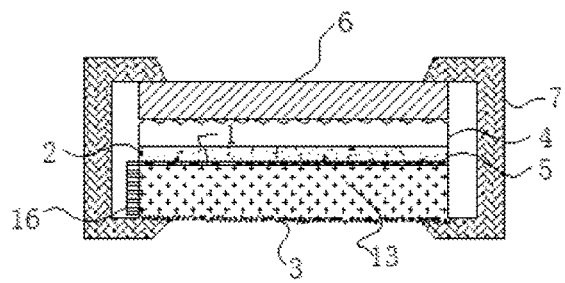
FIG. 15 is a schematic structural diagram of the embodiment 8 of the present invention.

As shown in FIG. 15, the flat lamp also includes a glass plate 13; the face of the glass plate 13 superimposing the reflection layer 2 is a back face and the other face is a front side; a plurality of light guide points 5 are formed on the back face 13 of the glass plate 13; the front face of the glass plate 13 is a rugged rough face; and the glass plate 13 forms an integrated light guide layer 1 and diffusion layer 3.

The front face of the glass plate 13 is a frosted face after polished, or the front face of the glass plate 13 is a jade sand face formed by erosion of liquid medicine.

Embodiment 9

Figure 16:
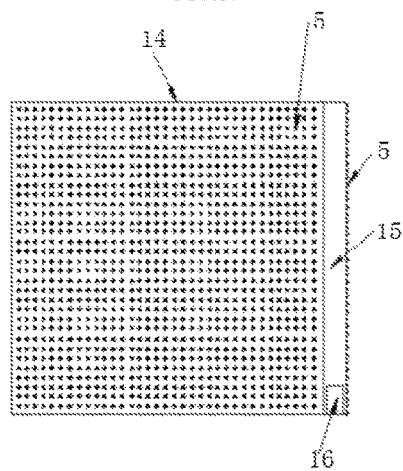
FIG. 16 is a schematic top view of the light guide structure according to the embodiment 9 of the present invention (taking the case that the rectangular central light guide layer is rectangular and only one side face is provided with the side light guide layer as an example)

As shown in FIG. 16, the light guide layer 1 is the central light guide layer 14 including a side light guide layer 15, the central light guide layer 14 has a back face, a light emitting face opposite to the back face and a side face positioned between the back face and the light emitting face; the back face of the central light guide layer 14 has a plurality of light guide points 5; the side light guide layer 15 is positioned on the side face of the central light guide layer 14; and the side light guide layer 15 has a rear face parallel to the back face of the central light guide layer 14, a front face opposite to the rear face, an inner side face opposite to the central light guide layer 14, and an outer side face opposite to the inner side face; the inner side face of the side light guide layer 15 is in contact with the side face of the central light guide layer 14, the outer side of the side light guide layer 15 has a plurality of light guide points 5; the light source 16 is arranged at the side light guide layer 15; and the light source 16 is incident between the inner and outer side faces of the side light guide layer 15 along the length direction of the side light guide layer 15.

The central light guide layer 14 is rectangular and at least one of the side face is provided with the side light guide layer 15, as shown in FIG. 16.

The four side light guide layers 15 are arranged on the four side faces of the central light guide layer 14, the side light guide layers 15 on the four side faces are connected into a circle, and one side face of the end parts of the side light guide layers 15 is provided with the light source 16.

The light source 16 is embedded in the side light guide layer 15.

The inner side face of the side light guide layer 15 is same in size as the side face of the central light guide layer 14 in which the side light guide layer is positioned.

The rear face of the side light guide layer 15 is covered with a reflective layer 2 and the front face of the side light guide layer 15 is covered with a reflective layer 2.

Embodiment 10

Figure 17:
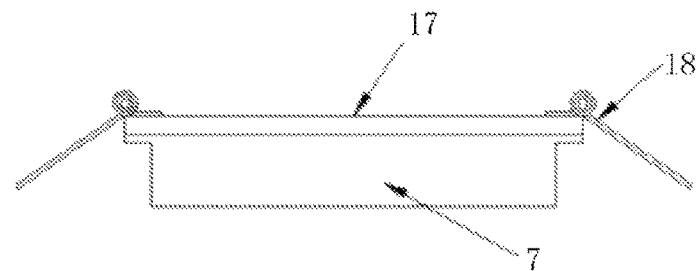
FIG. 17 is a schematic structural diagram of the overall structure of the embodiment 10 of the present invention.

As shown in FIG. 17, the flat lamp includes an installation top shell 17 with the fixed device 18, the fixed device 18 can fix the installation top shell 17 on the ceiling, and the outer frame 7 is detachably connected to the installation top shell 17.

Preferably, the fixed device 18 is a clamp spring.

Since the installation top shell 17 arranged on the ceiling and the outer frame 7 detachably connected to the installation top shell 17 are formed separately, when installing, the installation top shell 17 is fixed to the ceiling first; compared with the traditional integrated LED flat lamps, the difficulty of installation is reduced; more importantly, when the traditional integrated LED flat lamps are damaged, the whole flat lamps need to be disassembled, so the ceiling gets easily damaged, but according to the invention, only the part of the flat lamp except frame need to be detached from the installation top shell 17, the ceiling is not damaged at all, and the maintenance and replacement of the flat lamp are very convenient.

Embodiment 11

Figure 18:
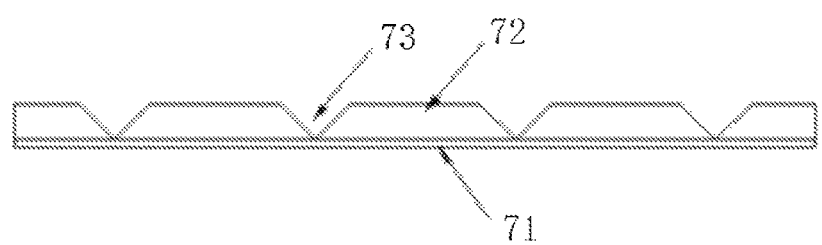
FIG. 18 is a schematic structural diagram of the metal section according to the embodiment 11 of the present invention.
Figure 19:
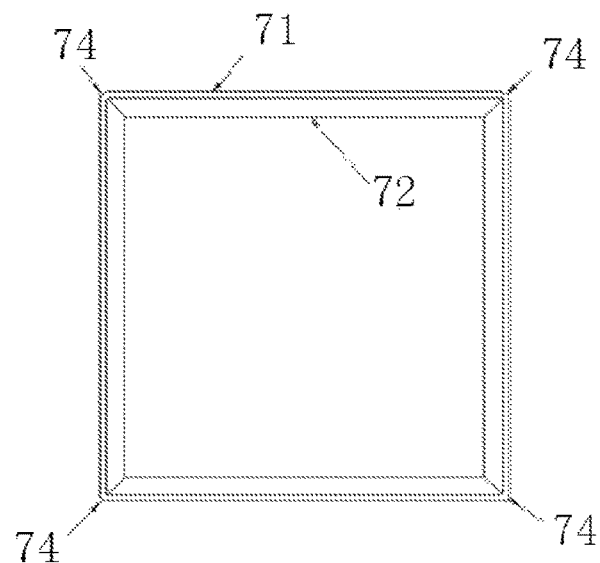
FIG. 19 is a schematic structural diagram of the metal outer frame according to the embodiment 11 of the present invention.

As shown in FIGS. 18 and 19, the outer frame 7 is a metal outer frame, the metal outer frame is rectangular, formed by bending and welding a whole metal section, the metal section is provided with a first face 71 and a second face 72 which are mutually vertical and integrally formed, the first face 71 is a continuous strip shape, the second face 72 is a broken strip shape with four incisions 73, each of the incision 73 is similar and has isosceles triangle shape with a vertex angle of 90 degrees, the four incisions 73 divide the second face 72 into five trapezoidal faces, the metal section is bent at the four incisions 73 and form a rectangular metal outer frame through an end to end connection, the first face 71 of the metal section is bent at the positions corresponding to the four incisions 73 respectively to form four rounded corners 74, welding between the adjacent trapezoidal faces of the second face of the metal section and the trapezoidal faces connected end to end is done at the waist, the first face 71 of the metal section forms the side frame face of the metal outer frame and the four rounded corners 74 form four corners of the metal outer frame, and the second face 72 of the metal section forms the front bearing face of the metal frame.

The four corners of the metal outer frame are rounded corners 74 formed by bending profiles, so that the metal outer frame has the advantages of smoothness, avoids hand injury, safe, reliable and beautiful.

Embodiment 12

Figure 20:
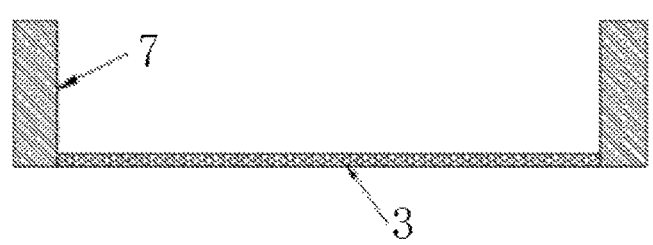
FIG. 20 is a schematic structural diagram of the plastic cover according to the embodiment 12 of the present invention.
Figure 21:
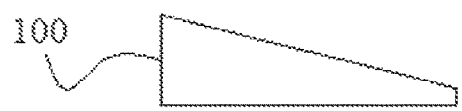
FIG. 21 is a schematic structural diagram of the light guide plate of the present invention (the light guide plate is a wedge-shaped light guide plate)

As shown in FIG. 20, the outer flame 7 is a plastic outer frame and integrally formed into a plastic outer cover with the diffusion layer 3, and the diffusion layer 3 is integrally connected with the front end of the plastic outer frame at the edge thereof.

The plastic outer frame has the front bearing face, the outer periphery of the front bearing face is integrally connected with the front end of the side wall, and the inner periphery of the front bearing face is integrally connected with the edge of the plastic diffusion layer.

Because the outer frame and the diffusion layer are integrally formed, the invention has the advantages of easy processing, low cost, convenient assembly and the like; and because the outer frame 7 and the diffusion layer are integrated, the outer frame 7 no longer has a front-end bearing face, so that the light emitting area of the flat lamp can be increased after omitting the front-end bearing surface.

Embodiment 13

A flat lamp, the light source 16 is incident on the side face of the light guide layer 1, and the flat lamp is provided with long afterglow materials.

Preferably, the structure of the flat lamp provided with the long afterglow material in the flat lamp is that, the long afterglow light-transmitting plastic plate is arranged between the reflection layer 2 and the light guide layer 1, or/and between the light guide layer and the diffusion layer 3.

The long afterglow light-transmitting plastic plate is a light-transmitting plastic flake, the face of which is coated with a long afterglow coating, the light-transmitting plastic flake is a long afterglow light-transmitting plastic flake formed by adding long afterglow materials into the raw materials, and is provided with a light incident face and a light emitting face opposite thereto, at least one of the light incident face and the light emitting face is coated with the long afterglow coating, the face on the light-transmitting plastic flake is called a coating face, and the structure of the long afterglow coating on the light-transmitting plastic plate is one of the following four:

1. The coating face is completely coated by a long afterglow coating of the same color;
2. The coating face is divided into at least two regions, each region is correspondingly coated with a long afterglow coating of one color, and different regions are coated with the long afterglow coatings of different colors to form an indicating diagram;
3. The coating face is divided into a bare area exposing the coating surface and a covering area covering the long afterglow coating, and the long afterglow coating covers the covering area to form an indication diagram;
4. The long afterglow coating has at least two layers, at least the two layers of the long afterglow coating have different colors and different coating ranges to form an indicating diagram.

Therefore, the long afterglow materials in the flat lamp can store light when light rays (including the light source in the flat lamp and natural light) are incident; the long afterglow materials in the flat lamp can slowly release the light rays to provide the function of illumination or indicating lamp after power-off, such as low-level illumination used in public places (hotels, office buildings and other) or home toilets after power-off or lights off at night, or forming patterns, letters and arrows for indicating places such as toilets, safety exit and the like, and the LED flat lamp of the present invention is a green energy-saving lamp.

In addition, the structure of the light guide points 5 is one of the following:

1. The light guide points 5 are positioned on the back Lace of the light guide layer 1;
2. The light guide points 5 are positioned on the reflective layer 2 and face the side of the light guide layer 1;
3. Further including a transparent film on which the light guide points 5 are printed, and the transparent film is adhered to the back face of the light guide layer 1;
4. Further including a transparent film on which the light guide points 5 are printed, and the transparent film is adhered to the reflective face of the reflective layer 2.

The light guide points 5 are convex dots or concave dots.

The light guide points 5 are composed of ink screen printing coating, hot pressing, laser dotting or dots or lines directly formed on the back face of the light guide layer.

Preferably, the structure of the light guide points 5 is one of the following:

1. The light guide points 5 are convex dots with a convex height of 0.01 to 0.2 mm formed by diffusion agents screen printed or coated on the back face of the light guide layer 1;
2. The light guide points are convex dots with a convex height of 0.001-0.03 mm formed by emitted through a mold and transferred to the back face of the light guiding layer 1;
3. The light guide points are concave dots with a concave depth of 0.01-0.2 mm formed by hot pressing on the back face of the light guiding layer 1;
4. The light guide points are concave dots with a concave depth of 0.05-0.3 mm formed by laser processing on the back face of the light guiding layer 1;

The shape of the light guide points 5 is a rhombus, a regular pentagon, an equilateral triangle, a circle, a regular hexagon, an ellipse, or a regular octagon.

The light guide layer 1 is a glass layer or a transparent plastic layer and the transparent plastic layer is a PMMA layer, a PC layer, a GPPS layer or a PET layer.

The light source 16 is LED, OLED (Organic Light Emitting Diode) or laser.

On the side face of the light guide layer 1, reflection sheets are provided except for the portion the light source positioned.

Embodiment 14

The processing method for the wedge-shaped light guide at of the flat lamp includes the following steps:

S1. Melting solid raw materials for processing the light guide plate into liquid resins;

S2. Extruding the liquid resins to a nip roller group 21 by a plastic extruder, the nip roller group 21 is provided with at least one group and each one includes a first roller 22 and a second roller 23 which are not parallel to each other; an included angle is formed between the first roller 22 and the second roller 23; the liquid resins are extruded by the first roller 22 and the second roller 23 when passing between the first roller 22 and the second roller 23, then form a wedge-shaped light guide plate after cooling.

In specific implementation, the first roller 22 is horizontally disposed, and the second roller 23 is obliquely disposed or the first roller 22 is vertically disposed, and the second roller 23 is obliquely disposed.

One detailed description of the embodiment is that light guide plate 100 is a wedge-shaped light guide plate with a right-angle trapezoidal cross section; in step S2, the first roller 22 and the second roller 23 are both cylindrical. And in the embodiment, the included angle between the first roller 22 and the second roller 23 is adjustable.

Another detailed description of the embodiment is that the light guide plate 100 includes wedge-shaped light guide parts 101 with right-angle trapezoidal cross sections and light incident adjusting parts positioned at least one side of the high and low sides of the wedge-shaped light guide part; the cross section of the light incident adjusting parts are rectangular:

In step S2, the first roller 22 is a cylinder, the middle of the second roller 23 is a cylinder, and the end parts of the second roller 23 form truncated cones matched with the light incident adjusting parts of the light guide plate.

And in the embodiment, the angle between the first roller 22 and the second roller 23 is preset by the nip roller group during production.

Figure 26:
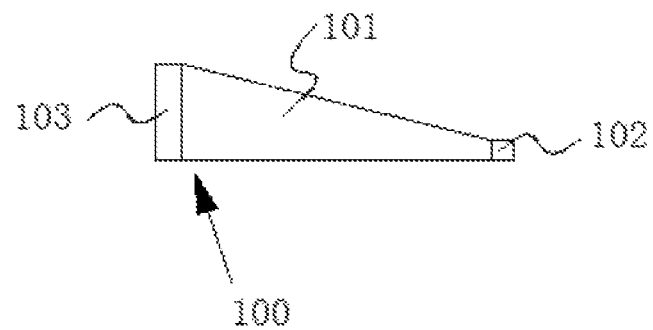
FIG. 26 is a schematic structural diagram of the light guide plate according to the present invention (two sides of the light guide plate are provided with light incident adjusting parts)

In the embodiment, preferably the number of light incident adjusting parts are two, including a first light incident adjusting part 102 positioned on the lower side of the wedge-shaped light guide part 101 and a second light incident adjusting part 103 positioned on the higher side of the wedge-shaped light guide part 101, as shown in FIG. 26.

Figure 27:
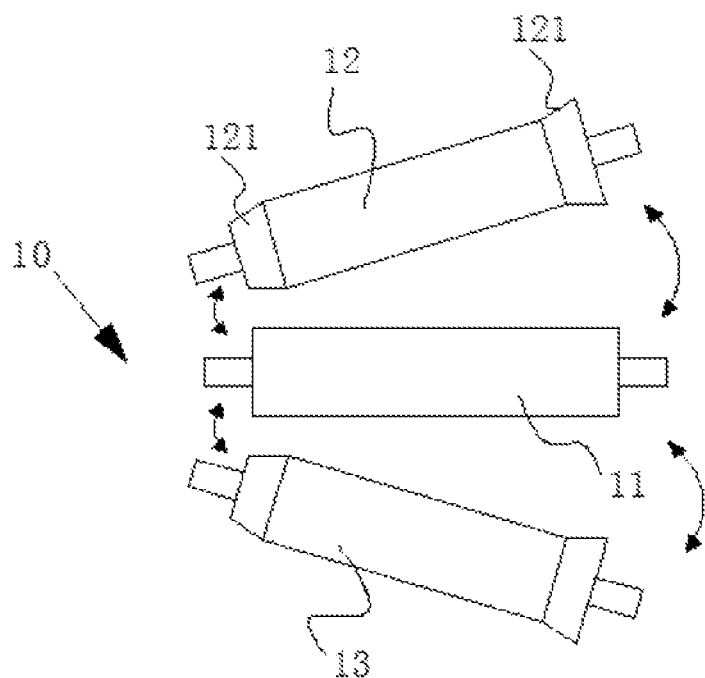
FIG. 27 is a front view of the nip roller group of the present invention (two sides of the light guide plate are provided with light incident adjusting parts).

In step S2, the first roller 22 is a cylinder, the middle of the second roller 23 is a cylinder, and one end part of the second roller 23 forms a first truncated cone matched with the first light incident adjusting part 102 of the light guide plate 100, and the other end part also forms a second truncated cone 231 matched with the second light incident adjusting part 102, as shown in FIG. 27.

In the step S2, the nip roller group 21 includes a first roller 22, a second roller 23 and a third roller 24, the second roller 23 and the third roller 24 are symmetrically arranged; the liquid resins are initially shaped between the first roller 22 and the second roller 23 and then are shaped again between the first roller 22 and the third roller 24 to form the light guide plate 100. And the angle between the first roller 22 and the second roller 23 is preset by the nip roller group during production.

Figures 1, 22:
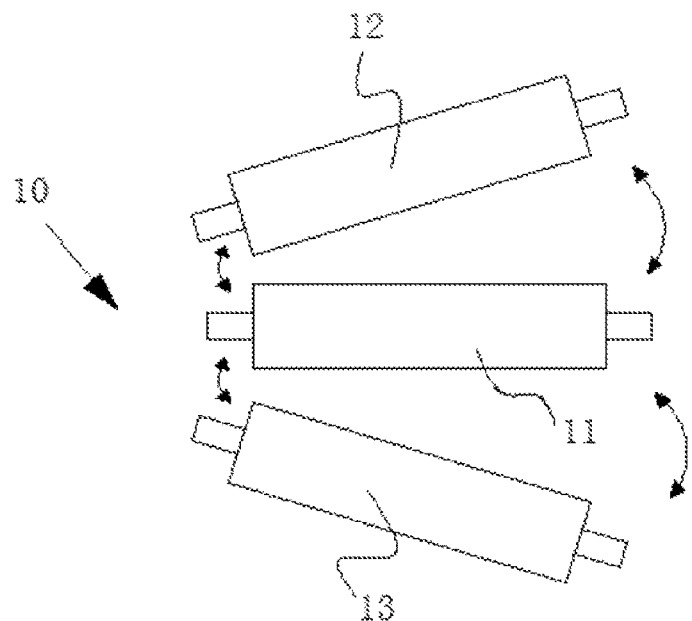
Figures 2, 22:
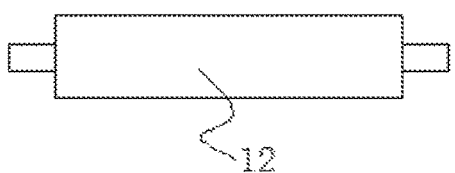
Figures 3, 22:
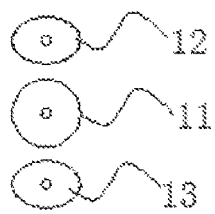

In this embodiment, the first roller 22, the second roller 23 and the third roller 24 are positioned in the same vertical plane, and the first roller 22 is parallel to the horizontal plane in the longitudinal direction (i.e., the second roller 23 and the third roller 24 are positioned above and below the first roller 22 respectively), the second roller 23 and the third roller 24 are symmetrically arranged with the axis of the first roller 22 as a center line, as shown in FIGS. 22-1 and 22-3.

In the step S2, at least one of the face of the first roller 22 and the second roller 23 is provided with a pattern, when the liquid resins pass between the first roller 22 and the second roller 23, the pattern is pressed on the face of the light guide plate 100 to form light guide pattern and a continuous light guide plate, and then the continuous light guide plate 100 is cut into light guide plates of a desired size.

At least one of the face of the first roller 22 and the second roller 23 is provided with a pattern in a dot shape, a line shape, a prism shape or a mesh shape, but is not limited thereto.

Or, in step S2, the faces of the first roller 22 and the second roller 23 are both smooth faces, and the liquid resins form a continuous and smooth light guide plate 100 after passing between the first roller 22 and the second roller 23; and then the continuous light guide plate is cut into light guide plates of a desired size.

At least one side of the light guide plate has a light guide pattern, the structure of the light guide pattern is one of the following three:

1. The light guide pattern is a pattern formed on the face of the light guide plate through a laser dotting process;
2. The light guide pattern is a pattern formed on the the of the light guide plate through an ink printing process;
3. The light guide pattern is a pattern formed on face of the light guide plate through a hot embossing process.

The light guide plate is provided with a pattern in a dot shape, a line shape, a prism shape or a mesh shape, but is not limited thereto.

Embodiment 15

Figures 1, 23:
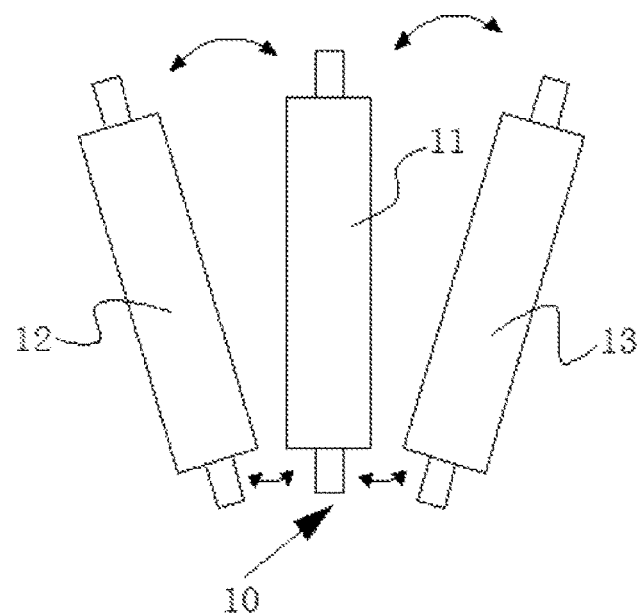
Figures 2, 23:
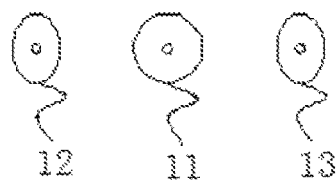
Figures 3, 23:
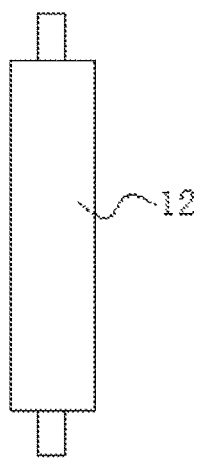

Embodiment 15 is similar to the embodiment 14, except that: the first roller 22 the second roller 23 and the third roller 24 are positioned in the same vertical plane, and the first roller 22 is parallel to the vertical plane in the longitudinal direction (such as, but not limited to, the second roller and the third roller being positioned forward and backward, or left and right of the first roller), the second roller 23 and the third roller 24 are symmetrically arranged with the axis of the first roller 22 as a center line, as shown in FIGS. 23-1 and 23-3.

Embodiment 16

Figures 1, 24:
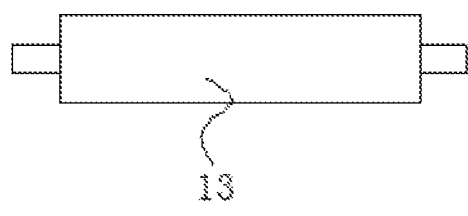
Figures 2, 24:
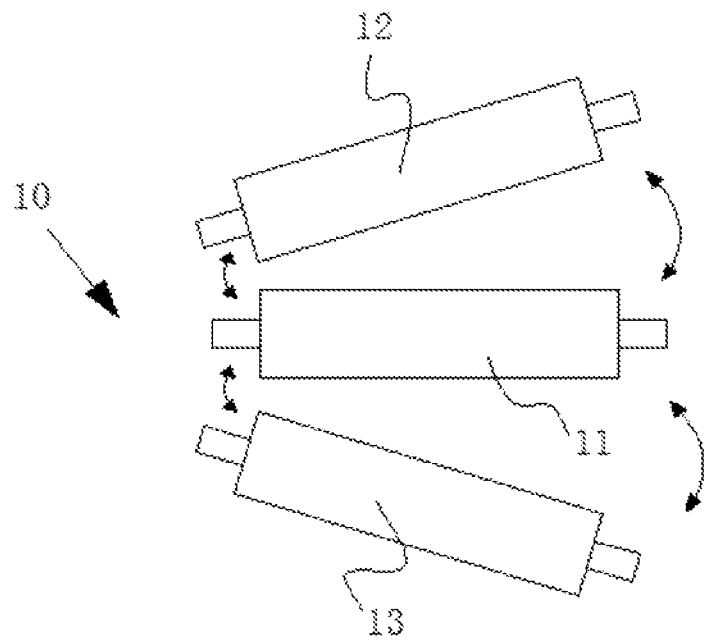
Figures 3, 24:
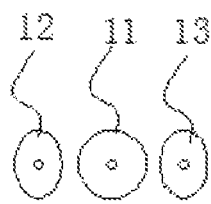

Embodiment 16 is similar to the embodiment 14, except that: the first roller 22, the second roller 23 and the third roller 24 are positioned in the same horizontal plane, and the first roller 22 is parallel to the horizontal plane in the longitudinal direction (such as, but not limited to, the second roller and the third roller being positioned forward and backward, or left and right of the first roller), the second roller 23 and the third roller 24 are symmetrically arranged with the axis of the first roller as a center line, as shown in FIGS. 24-1 and 24-3.

Embodiment 17

Figures 1, 25:
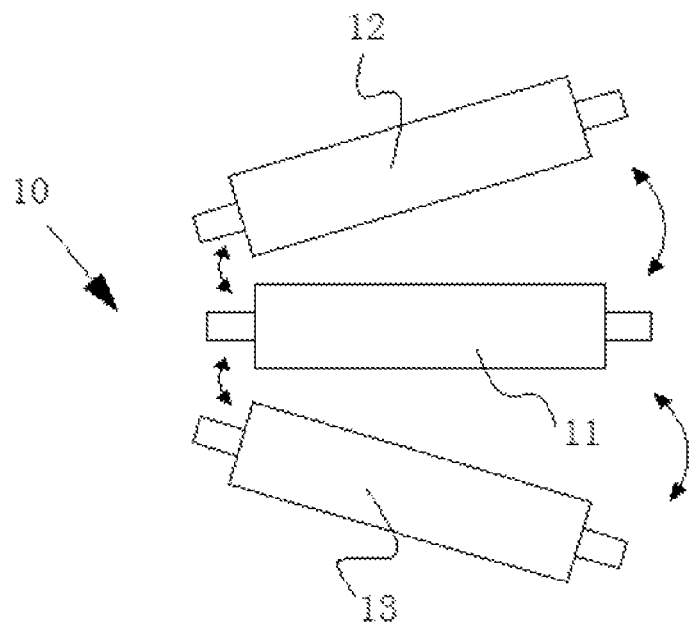
Figures 2, 25:
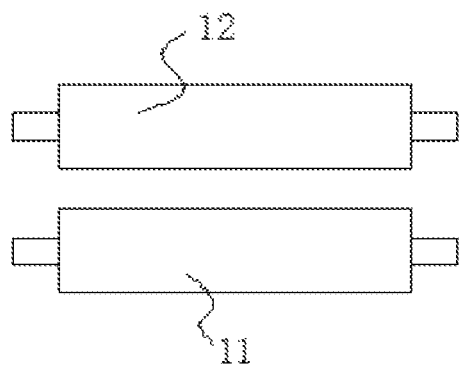
Figures 3, 25:
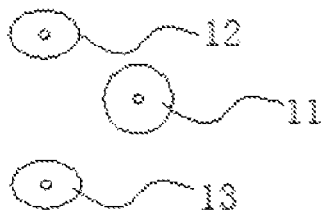

Embodiment 17 is similar to the embodiment 14, except that: the first roller 22, the second roller 23 and the third roller 24 are not in the same plane, and the second roller 23 is mirror-symmetric with the third roller 24 in any plane in which the axis of the first roller is positioned (for example, the first roller is parallel to the horizontal plane in the length direction, and the second roller and the third roller are mirror-symmetric with the horizontal plane), as shown in FIGS. 25-1 to 25-3.

Embodiment 18

The angle-adjustable nip roller group 21 used for producing the wedge-shaped light guide plate is provided with at least one group, and each group includes a first roller 22 and a second roller 23 which are not parallel to each other, an angle is formed between the first roller 22 and the second roller 23, and the magnitude of the angle can be adjusted, the method for realizing the adjustable angle between the first roller 22 and the second roller 23 is one of the following two:

1. The end of the second roller 23 close to the first roller 22 can rotate in the plane where the second roller 23 and the first roller 22 are positioned;
2. The end of the second roller 23 far away from the first roller 22 can be lifted or lowered in the plane of the second roller 23 and the first roller 22.

The assembly, enabling the end of the second roller 23 close to the first roller 22 to rotate in the plane where the second roller 23 and the first roller 22 are positioned, is provided with a rotating cylinder connected with the rotating shaft of the second roller 23, and the rotating cylinder can drive the rotating shaft of the second roller 23 to rotate so as to adjust the angle between the second roller 23 and the first roller 22.

However, the method is not limited thereto. For example, it may be manually adjusted.

The assembly enabling one end of the second roller 23 far away from the first roller 22 to lift or fallback in the plane where the second roller 23 and the first roller 22 are positioned, is provided with a cylinder and a push rod, wherein the cylinder is connected with one end of the push rod; the other end of the push rod is connected with a rotating shaft of the second roller 23 far away from the end of the first roller 22; and the cylinder can drive the one end of the second roller 23 far away from the first roller 22 to lift or fallback so as to adjust of the angle between the second roller 23 and the first roller 22.

However, the method is not limited thereto. For example, it may be manually adjusted.

The light guide plate 100 is a wedge-shaped light guide plate with a right-angle trapezoidal cross section; the first roller 22 and the second roller 23 are both cylindrical.

Face of the first roller 22 and the second roller 23 is provided with a pattern, the liquid resins pass between the first roller and the second roller.

At least one of the face of the first roller 22 and the second roller 23 is provided with a pattern in a dot shape, a line shape, a prism shape or a mesh shape, but is not limited thereto.

Or, the faces of the first roller 22 and the second roller 23 are both smooth faces, and the liquid resins pass between the first roller 22 and the second roller 23 to form a continuous and smooth light guide plate.

In the embodiment, preferably, the nip roller group 21 includes the first roller 22, the second roller 23 and the third roller 24, the second roller 23 and the third roller 24 are symmetrically arranged.

The first detailed description is as followings: the first roller 22, the second roller 23 and the third roller 24 are positioned in the same vertical plane, and the first roller 22 is parallel to the horizontal plane in the longitudinal direction (i.e., but not limited to, the second roller and the third roller are positioned above and below the first roller respectively), the second roller 23 and the third roller 24 are symmetrically arranged with the axis of the first roller 22 as a center line, as shown in FIGS. 22-1 and 22-3.

The second detailed description is as following: the first roller 22, the second roller 23 and the third roller 24 are positioned in the vertical plane, and the first roller 22 is parallel to the vertical plane in the longitudinal direction (such as, but not limited to, the second roller and the third roller being positioned forward and backward, or left and right of the first roller), the second roller 23 and the third roller 24 are symmetrically arranged with the axis of the first roller 22 as a center line, as shown in FIGS. 3-1 and 3-3.

The third detailed description is as following: the first roller 22, the second roller 23 and the third roller 24 are positioned in the horizontal plane, and the first roller 22 is parallel to the horizontal plane in the longitudinal direction (such as, but not limited to, the second roller and the third roller being positioned forward and backward, or left and right the first roller), the second roller 23 and the third roller 24 are symmetrically arranged with the axis of the first roller 22 as a center line, as shown in FIGS. 24-1 and 24-3.

The fourth detailed description is as following: the first roller 22, the second roller 23 and the third roller 24 are not in the same plane, and the second roller 23 is mirror-symmetric with the third roller 24 in any plane in which the axis of the first roller 22 is positioned (for example, the first roller is parallel to the horizontal plane in the longitudinal direction, and the second roller and the third roller are mirror-symmetric with the horizontal plane), as shown in FIGS. 25-1 to 25-3.

The above description merely shows some embodiments of the present invention and is not intended to limit the scope of the present invention, any equivalent structure made by using the description and drawings of the present invention, or directly or indirectly applied to other related technical fields, is likewise included within the protection scope of the present invention.

The invention claimed is:

1. A flat lamp comprising:
   a light guide layer;
   a reflective layer;
   a diffusion layer;
   a buffer layer and a backplane;
   wherein the light guide layer has two opposite faces including a back face and a light-emitting face;
   the reflective layer is located on the back face of the light guide layer;
   the diffusion layer is located on the light-emitting face of the light guide layer;
   the buffer layer is located between the backplane and the reflective layer;
   a transparent film is provided between the reflective layer and the light guide layer;
   a plurality of light guide points are printed on the transparent film;
   the flat lamp further comprises a light source and an outer frame;
   wherein the diffusion layer, the light guide layer, the reflective layer, the buffer layer and the backplane are all fixed in the outer frame;
   incident points of the light source are located on a lateral side of the light guide layer;
   a stacked structure composed of the backplane, the light guide layer, the reflective layer, the buffer layer and the diffusion layer is in the shape of a flat plate;
   wherein the buffer layer is a plastic sucking buffer layer which adopts a plastic sucking process, which is a plastic sucking product composed of convex parts and concave parts arranged in a row;
   wherein the convex parts and the concave parts are alternatively arranged in the row and are configured to absorb heat expansion deformation of the light guide layer.

2. The flat lamp according to claim 1, wherein the light guide layer is a wedge-shaped light guide layer with a right-angled trapezoidal cross-section; a thick side of the light guide layer is a light incident side provided with LED light bars, and a thin side of the light guide layer is provided with buffer materials.

3. The flat lamp according to claim 1, wherein the stacked structure composed of the backplane, the light guide layer, the reflection layer, the buffer layer and the diffusion layer is in the shape of a flat plate structure which is one of the following three:
   (1) the light guide layer, the buffer layer, the reflective layer and the backplane are all in the shape of a flat plate;
   (2) the light guide layer is a wedge-shaped light guide layer with a right-angled trapezoidal cross-section, the buffer layer is a wedge-shaped buffer layer with a right-angled trapezoidal cross-section, and the back face of the light guide layer is a first inclined plane, the side of the buffer layer close to the reflection layer is a second inclined plane, the first inclined plane is parallel to the second inclined plane, the reflection layer is positioned between the first inclined plane and the second inclined plane, and the backplane and the reflection layer are in the shape of a flat plate;

(3) the light guide layer is a wedge-shaped light guide layer with a right-angled trapezoidal cross-section, the backplane is a wedge-shaped layer with a right-angled trapezoidal cross-section, and the back face of the light guide layer is a first inclined plane, the inner face of the backplane is a second inclined plane, the first inclined plane is parallel to the second inclined plane, and the backplane and the reflection layer are both in the shape of a flat plate.

4. The flat lamp according to claim 1, wherein the diffusion layer comprises a first diffusion monolayer and a second diffusion monolayer;

the first diffusion monolayer has opposite two faces including a light incident face and a first superimposed face of the diffusion layer;

the second diffusion monolayer has opposite two faces including a light-emitting face and a second superimposed face of the diffusion layer;

the first superimposed face of the first diffusion monolayer and the second superimposed face of the second diffusion monolayer are superimposed on each other;

the incident face of the first diffusion monolayer and the light-emitting face of the light guide layer are in contact with each other, and the hardness of the first diffusion monolayer is smaller than that of the second diffusion monolayer.

5. The flat lamp according to claim 4, wherein a structure of the diffusion layer is one of the following three:

(1) one of the first diffusion monolayer and the second diffusion monolayer is a colored layer;

(2) the first diffusion monolayer and the second diffusion monolayer are both colored layers;

(3) the first diffusion monolayer and the second diffusion monolayer are both natural color layers, and further comprising a light transmitting colored layer positioned between the first diffusion monolayer and the second diffusion monolayer.

6. The flat lamp according to claim 1, wherein
the light source is two LED light bars positioned on the side face of the light guiding layer;
the light guiding layer is in the shape of square;
the light guiding layer is provided with opposite back face and light-emitting face, and four side faces, the back face of the light guiding layer is provided with a plurality of light guiding points;
the two LED light bars are arranged at one pair of adjacent side faces of the light guiding layer respectively; and
the other pair of adjacent side faces of the light guiding layer are provided with buffer materials.

7. The flat lamp according to claim 1, wherein
the light source is positioned in the outer frame and on the side face of the light guide layer;
at least one of the outer frame and the backplane is provided with slots for inserting and removing the light source.

8. The flat lamp according to claim 1, wherein
a light entrance for guiding light is reserved on the outer frame and on the side face of the light guide layer.

9. The flat lamp according to claim 1, wherein
the light guide layer is spliced;
the light guide layer is formed by splicing a plurality of light guide plates on the same plane;
and the reflective layer is closely superimposed on the back face of the light guide layer;
the contact face of the reflective layer and the light guide layer has light guide points; and the diffusion layer is 1-3 cm away from the light guide layer.

10. The flat lamp according to claim 1,
further comprising a glass plate; wherein
a face of the glass plate superimposed with the reflection layer is a back face and the other face is a front face;
a plurality of light guide points are formed on the back face of the glass plate;
the front face of the glass plate is a rugged rough face; and
the glass plate forms an integrated light guide layer and diffusion layer.

11. The flat lamp according to claim 1, wherein
the light guide layer is a central light guide layer, further comprising a side light guide layer;
the central light guide layer has a back face, a light-emitting face opposite to the back face, and a side face positioned between the back face and the light-emitting face;
the back face of the central light guide layer has a plurality of light guide points;
the side light guide layer is positioned on the side face of the central light guide layer;
and the side light guide layer has a rear face parallel to the back face of the central light guide layer, a front face opposite to the rear face, an inner side face opposite to the side face of the central light guide layer, and an outer side face opposite to the inner side face;
the inner side face of the side light guide layer is in contact with the side face of the central light guide layer, the outer side of the side light guide layer has a plurality of light guide points,
the light source is arranged at the side light guide layer; and
the light source is incident between the inner and outer side faces of the side light guide layer along the length direction of the side light guide layer.

12. The flat lamp according to claim 1, wherein the plurality of light guide points are printed at regular intervals, and a size of the plurality of light guide points increases gradually.

13. The flat lamp according to claim 1, wherein the plurality of light guide points are printed at gradually increasing intervals, and a size of each light guide point is same.

14. The flat lamp according to claim 1, wherein the plurality of light guide points are printed at gradually increasing intervals, and sizes of the plurality of light guide points increases gradually.

15. The flat lamp according to claim 1, wherein a shape of the plurality of light guide points is a rhombus, a regular pentagon, an equilateral triangle, a circle, a regular hexagon, an ellipse, or a regular octagon.

* * * * *